(12) United States Patent
Gaudet, Sr.

(10) Patent No.: US 7,461,479 B2
(45) Date of Patent: Dec. 9, 2008

(54) PLANT PROTECTION SYSTEM

(76) Inventor: Donald J. Gaudet, Sr., 19621 Carthage St., River Ridge, LA (US) 70123

( * ) Notice: Subject to any disclaimer, the term of this patent is extended or adjusted under 35 U.S.C. 154(b) by 241 days.

(21) Appl. No.: 11/141,827

(22) Filed: Jun. 1, 2005

(65) Prior Publication Data

US 2006/0272202 A1    Dec. 7, 2006

(51) Int. Cl.
*A01G 17/14* (2006.01)
(52) U.S. Cl. ............................................. 47/46
(58) Field of Classification Search .................. 47/23.2, 47/29.5, 29.6, 29.7, 30, 31.1, 32.4, 47, 2, 47/20.1, 44, 46; 403/207; 24/131 R, 712.8; 114/218; 289/17
See application file for complete search history.

(56) References Cited

U.S. PATENT DOCUMENTS

| | | | | | |
|---|---|---|---|---|---|
| 90,998 | A | * | 6/1869 | Heureuse | 24/131 R |
| 581,827 | A | * | 5/1897 | Landreth | 24/30.5 R |
| 893,441 | A | * | 7/1908 | Caruthers | 47/29.6 |
| 947,912 | A | * | 2/1910 | Jaquet | 47/46 |
| 963,099 | A | * | 7/1910 | Wells | 47/29.5 |
| 989,341 | A | * | 4/1911 | Dixon | 47/20.1 |
| 991,588 | A | * | 5/1911 | Wolf | 289/17 |
| 1,283,452 | A | * | 11/1918 | Bardin | 47/29.6 |
| 1,904,700 | A | * | 4/1933 | Starks | 47/20.1 |
| 1,916,868 | A | * | 7/1933 | Starks | 47/44 |
| 1,972,725 | A | * | 9/1934 | White | 24/129 R |
| 2,114,945 | A | * | 4/1938 | Thomson | 242/140 |
| 2,251,624 | A | * | 8/1941 | Foree et al. | 47/29.6 |
| 2,252,243 | A | * | 8/1941 | Zoppelt | 24/130 |
| 2,889,664 | A | * | 6/1959 | Olshansky | 47/29.1 |
| 3,051,185 | A | * | 8/1962 | Reynolds | 135/124 |
| 3,085,823 | A | * | 4/1963 | De Baere | 289/17 |
| 3,398,714 | A | * | 8/1968 | Kock et al. | 114/218 |
| 3,465,391 | A | * | 9/1969 | Armstrong | 24/115 R |
| 3,581,436 | A | | 6/1971 | Basiger | |
| 3,585,755 | A | | 6/1971 | Thomas | |
| 3,932,958 | A | | 1/1976 | Kistler | |
| 4,296,568 | A | | 10/1981 | Dukes | |
| 4,536,989 | A | | 8/1985 | Caywood | |
| 5,004,211 | A | | 4/1991 | Rayner | |

(Continued)

FOREIGN PATENT DOCUMENTS

CH            636498 A5 *   6/1983

OTHER PUBLICATIONS

Twine; Dictionary.com.*

*Primary Examiner*—Francis T Palo
(74) *Attorney, Agent, or Firm*—Juan J. Lizarraga

(57) ABSTRACT

A plant protection system which is economical, and quickly installed and removed and which can be used on row crops such as strawberries to protect against frost, freezing, and insects. The system includes a series of frames placed along a crop row wherein each frame has at least one twine engaging loop on the upper portion of the frame. Twine is tensioned along the upper sides of the frames by drawing the twine into an open end of the loop, looping the twine completely around the loop and proceeding to the next frame with the twine held in tension at the loop. A protective cover is draped over the frames and tensioned twine and anchored in the crop furrows. The tension of the twine between the frames prevents the cover from sagging and touching the crops.

1 Claim, 5 Drawing Sheets

U.S. PATENT DOCUMENTS

| | | |
|---|---|---|
| 5,083,396 A | 1/1992 | Traut |
| 5,179,798 A | 1/1993 | Sonagere |
| 5,241,782 A | 9/1993 | Mccarthy |
| 5,373,660 A | 12/1994 | Stiles |
| 5,916,028 A | 6/1999 | Downer |
| 5,992,088 A | 11/1999 | Henningsson |
| 6,293,521 B1 | 9/2001 | Parrish |
| 6,421,926 B1 | 7/2002 | Cappuccio |
| 2003/0977888 | 5/2003 | Pierce |
| 2004/0049976 A1 | 3/2004 | Maffel |
| 2006/0272202 A1 * | 12/2006 | Gaudet, Sr. .................... 47/31 |

* cited by examiner

… … …

PLANT PROTECTION SYSTEM

BACKGROUND OF THE INVENTION

This invention is generally related to a plant protection system that can be quickly and easily assembled in a field for protecting a crop of plants against adverse environmental conditions such as frost and freezing as well as insects or other pests. This invention has particular application to row crops such as strawberries and similar plants, but can be modified for other crops.

Cultivated crops have always been subject to the forces of nature and unseasonable climatic conditions such as frost or freezing can destroy a crop. Likewise, excessive or insufficient rainfall during the growing season can have a devastating effect on crops. Other natural threats such as insects are also a serious concern. Ideally, all these adverse conditions could be eliminated in a greenhouse enclosure, but that is obviously impossible and economically infeasible where thousands of acres are under cultivation.

In an attempt to replicate the benefits of a greenhouse but at a significantly reduced cost, several methods of covering crops in the field have evolved which involve draping a pliable cover such as plastic sheeting or other types of fabric over the crop to afford protection to the plants from external elements and propping up the pliable cover with a frame to keep it away from the plants. While this type of cover can be easily placed over a field of crops by unrolling across the field, if the cover touches the plants, their foliage, blossoms or fruit, damage can occur. This is commonly called "burn".

Because of their flexibility and pliability, such covers will naturally sag between rigid frames, making it difficult to prevent touching the plant. While it may be possible to stretch a cover to eliminate sag, this is generally not feasible because of the large field areas involved and the difficulty in securing the perimeter of the cover. Adding more rigid frames to shorten the distance between frames will alleviate the problem of sag to some extent but then the cost begins to increase, defeating the intended purpose of providing protection to the plants in an economical way. It is apparent that the covers must be supported in two directions, with the rigid frame providing support in one direction and support between the frames in the other direction being provided by another means.

SUMMARY OF THE INVENTION

It is an object of this invention to provide an economical plant protection system which can be installed easily and quickly over a field of crops without special tools or equipment and can be removed easily and quickly and stored for future use.

It is an object of this invention to provide a plant protection system for a row of plants in soil having a first row end and a second row end wherein the system includes a plurality of frames each having a first soil engaging end, an upper portion and a second soil engaging end. Each frame spans the row of crops with the first soil engaging end and the second soil engaging end pressed into the soil in the furrow on each side of the row. The frames are spaced along the row of plants from the first row end to the second row end. On the upper portion of each frame is at least one twine engaging loop formed as a circular loop of the upper portion of the frame with a loop open end and a loop closed end wherein there is a gap between the loop open end and the upper portion of the frame and the loop closed end is in contact with the upper portion of the frame. At least one twine, having a first twine end and a second twine end, is fixedly secured in the soil at the first row end and successively engaged under tension in a twine engaging loop on the upper portion of each frame extending along the crop row and the second twine end is fixedly secured in the soil at the second row end. The twine first engages the twine engaging loop at the loop open end, loops completely around the circular loop over the closed loop end and exits the twine engaging loop at the loop open in tension to engage the twine engaging loop on the next frame along the crop row.

The inventive plant protection system further comprises a cover having an inner surface and an outer surface, wherein said cover is draped over the frames and twine with the inner surface facing the plants but only in contact with the upper portion of each frame and twine.

It is a further object of this invention to provide an frame for spanning a crop row as part of a plant protection system wherein each frame has a first soil engaging end, an upper portion and a second soil engaging end and at least one twine engaging loop located on the upper portion, and wherein the twine engaging loop further comprises a circular loop of the upper portion of the frame with a loop open end and a loop closed end, wherein there is a gap between the loop open end and the upper portion of the frame and the loop closed end is in contact with the upper portion of the frame.

DETAILED DESCRIPTION OF THE INVENTION

Figure 1:
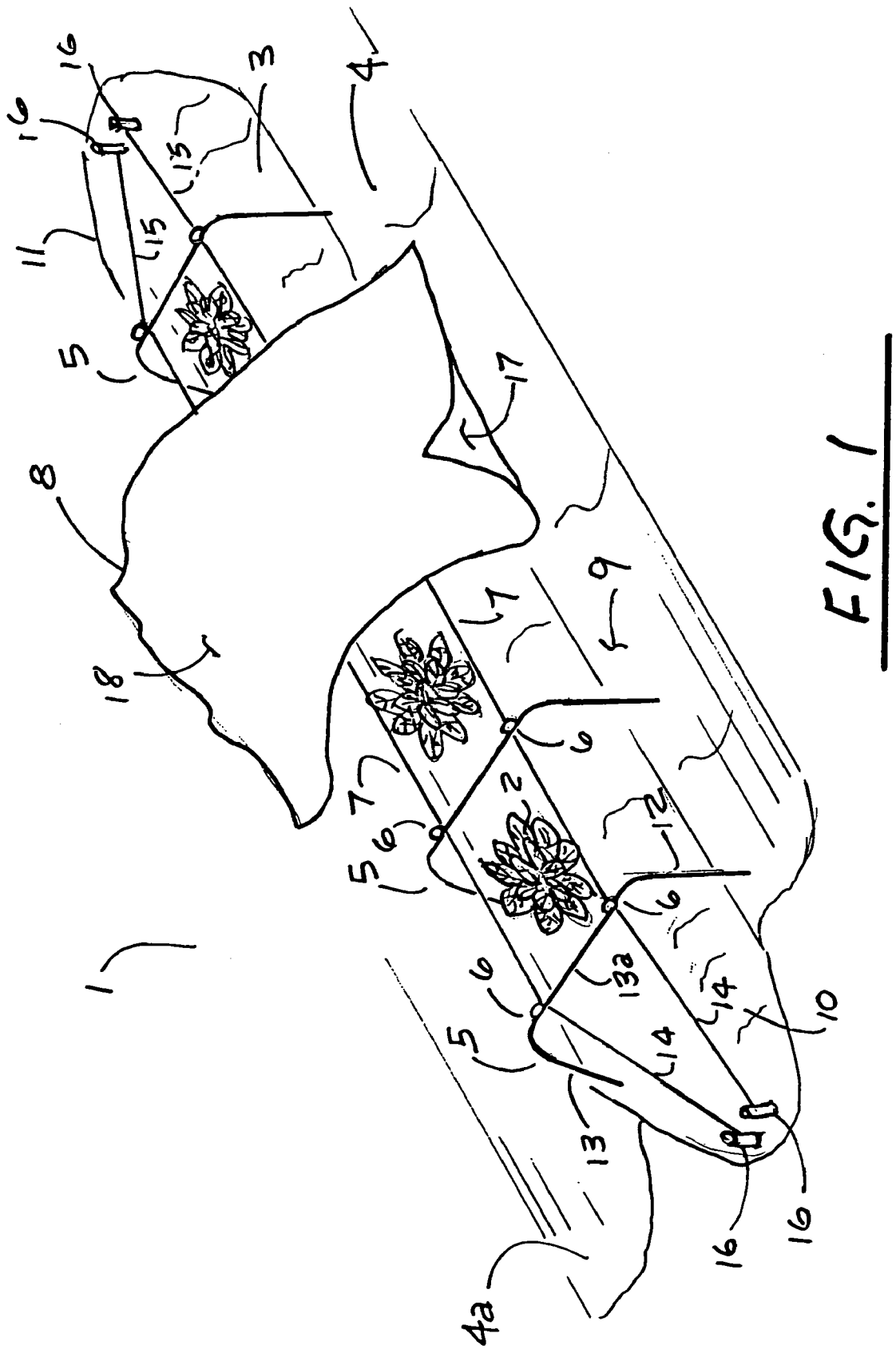
FIG. 1 is a perspective view of the inventive system in place.

FIG. 1 is a perspective view of the inventive plant protection system 1 in place over plants 2 in a crop row 3 with furrows 4 and 4a on both sides of the crop row 3. Frames 5 span the crop row 3 and are set in a plurality of positions along the crop row 3 from the first row end 10 to the second row end 11. Each frame has a first soil engaging end 12 and a second soil engaging end 13. The first soil engaging end 12 is pressed into the soil 9 in the furrow 4 and the second soil engaging end 13 is pressed into the soil 9 in the furrow 4a on the other side of the crop row 3. Although the first soil engaging end 12 and second soil engaging end 13 are shown pressed into the soil 9 in the furrows 4 and 4a, the soil engaging ends 12 and 13 can be pressed into the soil 9 on the crop row 3 itself depending on the width of the frame 5 and the width of the crop row 3.

Each frame 5 has an upper portion 13a with at least one twine engaging loop 6. As depicted in FIG. 1, the frames 5 have two twine engaging loops 6, which would normally be used. The number of twine engaging loops 6 would determine the number of twines 7 needed. In this depiction there are two twines 7, each having a first twine end 14 and a second twine end 15. Each first twine end 14 is fixedly tied to a stake 16 driven into the soil 9 at the first row end 10. Although two stakes 16 are depicted, one stake 16 could be used as well as any other method of tying off the first twine end 14. Once the first twine end 14 of each twine 7 is secured in this fashion at the first row end 10, each twine 7 is successively engaged in tension on the twine engaging loops 6 of the next frame 5 going from the first row end 10 to the second row end 11 and the second twine end 15 of each twine 7 is fixedly tied to a stake 16 driven into the soil 9 at the second row end 11 or otherwise tied off at the second row end 11.

With each frame 5 in place along the crop row 3 and each twine 7 tensioned between frames 5 at the twine engaging loops 6 and each first twine end 14 fixedly tied at the first row end 10 and each second twine end 15 fixedly tied at the second row end 11, a cover 8 with an inner surface 17 and an outer surface 18 is draped over the frames 5 and twines 7, with the inner surface 17 in contact with the frames 5 and twine 7, and held above the plants 2 to prevent contact between the inner surface 17 and the plants 2. The cover 8 can be draped in a direction across the length of the crop row 3 or draped along the length of the crop row 3 depending on the width and length of the cover 8 which would normally be supplied in rolls. The cover 8, once in position, can be easily held in place at the ends of the cover and in the furrows 4 by any suitable method such as soil weighting.

Figure 2:
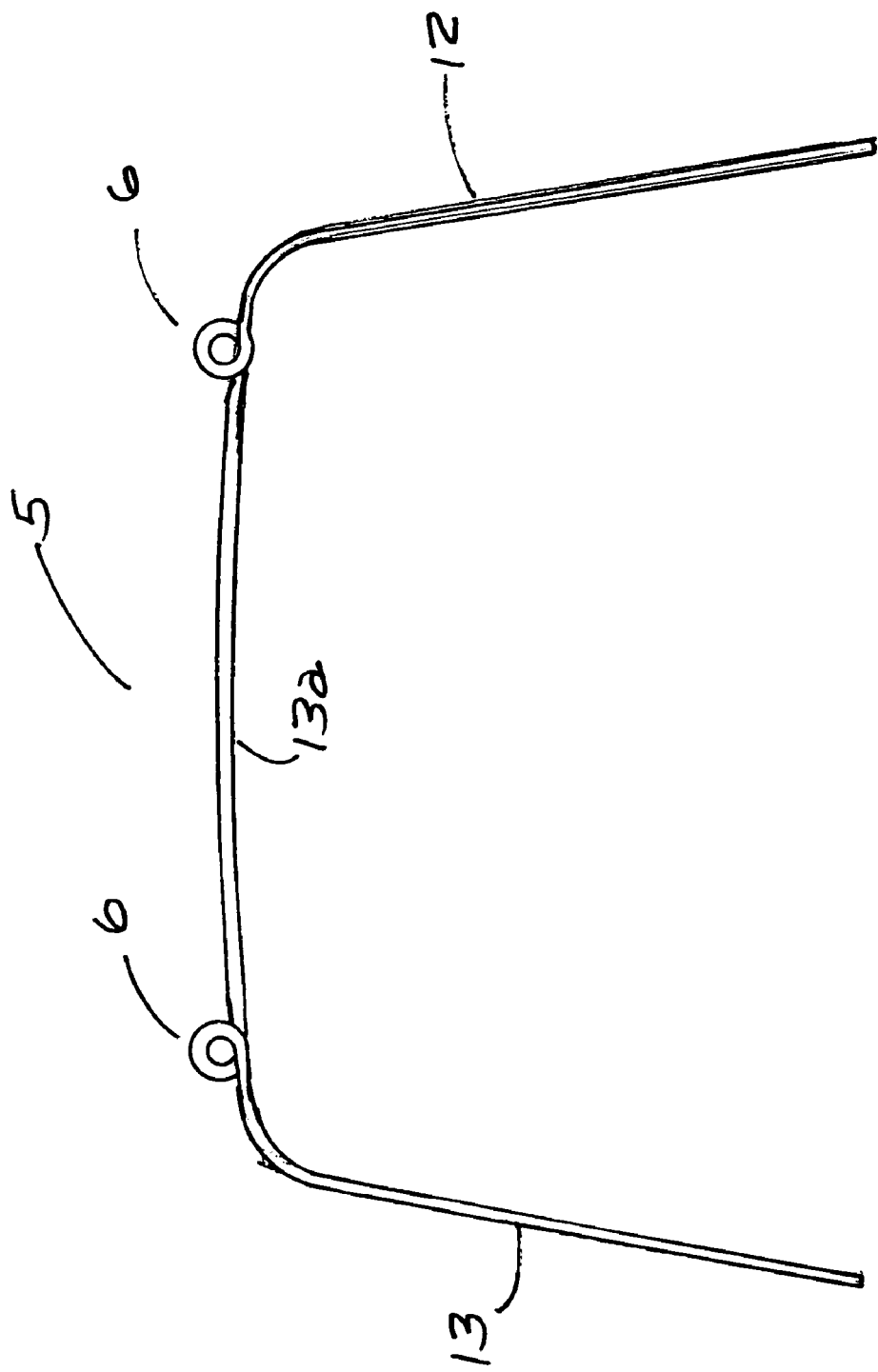
FIG. 2 is an elevation of a frame.

FIG. 2 is an elevation of an embodiment of the frame 5 with a first soil engaging end 12, a second soil engaging end 13, an upper portion 13a, and two twine engaging loops 6. A suitable material for the frame 5 would be galvanized steel wire of approximately 5 gauge, although other materials and coatings could be used. The embodiment of frame 5 shown in FIG. 2 would be approximately 20 inches wide and approximately 10 inches high, to suit the width of the crop row 3 and the height of the crop row 3 and plants 2. This general size is intended for strawberry crops but can be adapted to suit other plants. In a normal application for this embodiment of frame 5, a frame 5 would be placed along the crop row 3 approximately 10 feet apart.

Figure 3:
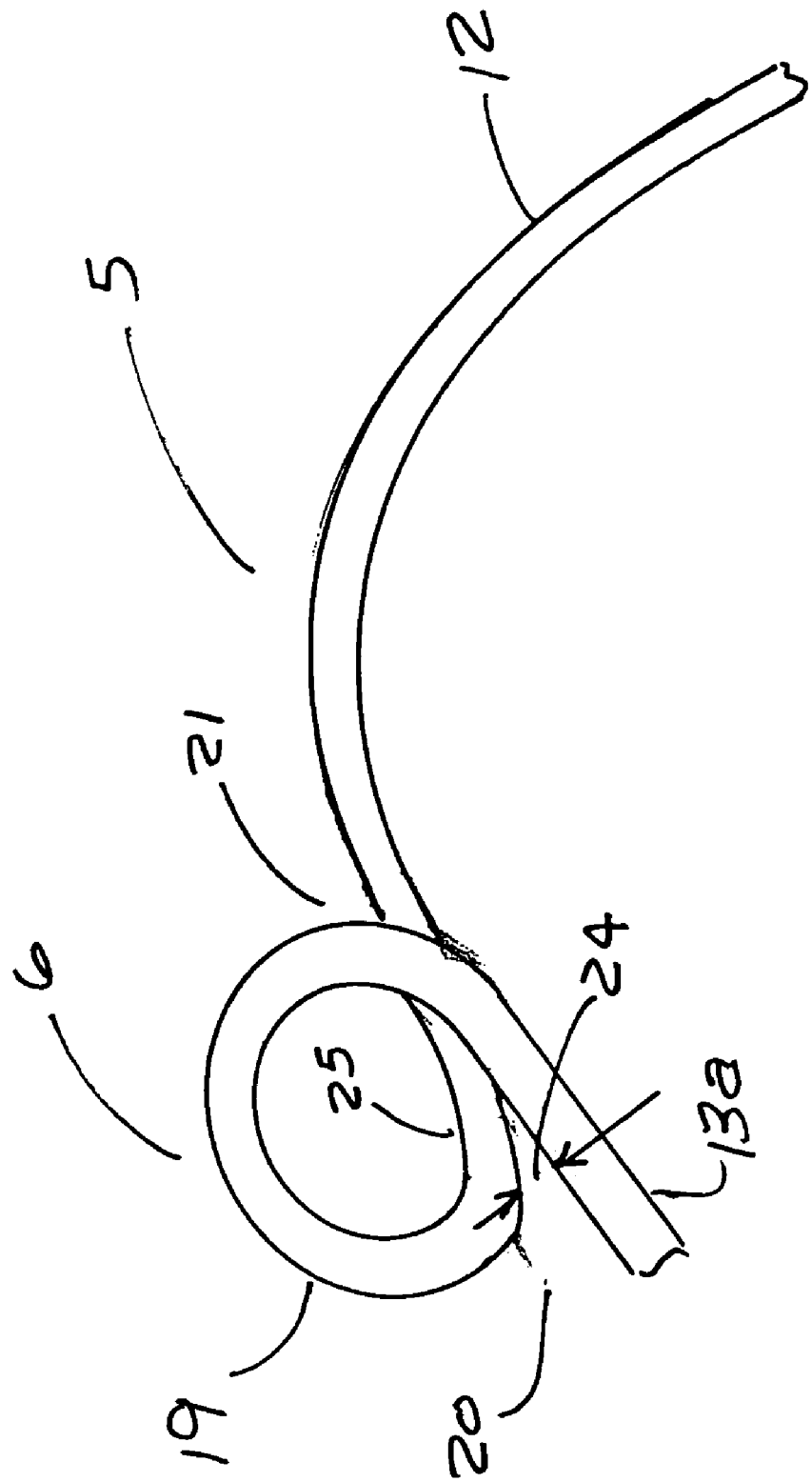
FIG. 3 is a perspective view of a twine engaging loop.

FIG. 3 is a perspective view of a typical twine engaging loop 6 on one side of the upper portion 13a of a frame 5. As can be seen in FIG. 3, the twine engaging loop 6 is formed by creating a circular loop 19 in the upper portion 13a of the frame 5. There is a loop open end 20 on one side of the circular loop 19 and a loop closed end 21 on the other side of the circular loop 19. In this embodiment the loop open end 20 is on the side of the circular loop 19 facing the upper portion 13a and the loop closed end 21 is on the side of the circular loop 19 closest to the first soil engaging end 12. Another twine engaging loop 6 on the other side of the upper portion 13a would be a mirror image of the twine engaging loop 6 shown in FIG. 3.

At the loop open end 20, the bottom 25 of the circular loop 19 is apart from the upper portion 13a of the frame 5 by a gap 24. At the loop closed end 21, the bottom 25 of the circular loop 19 is in contact with the upper portion 13a.

Figure 4:
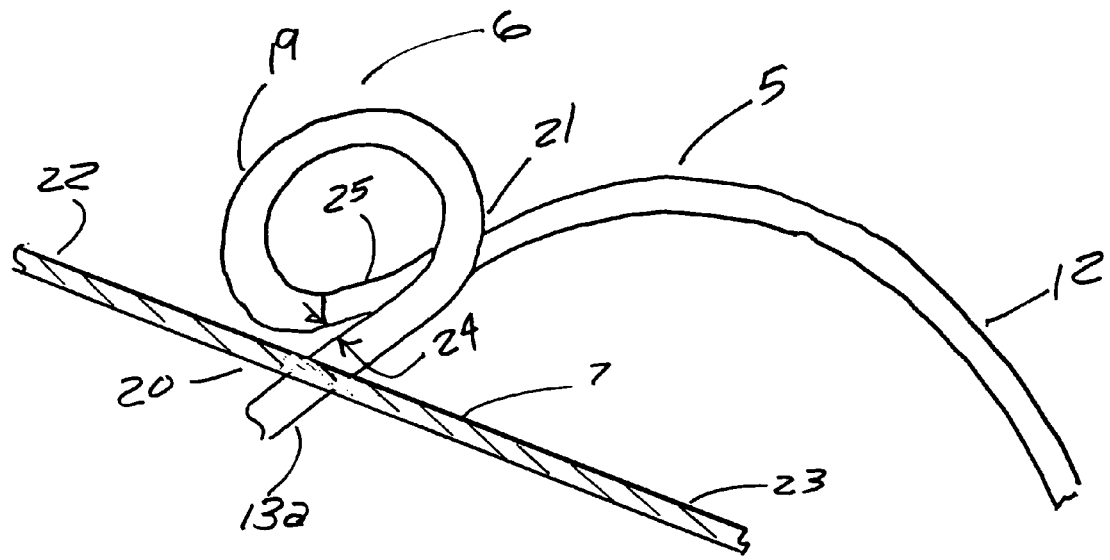
FIG. 4 is a perspective view of a twine first engaging a twine engaging loop.

FIG. 4 is a perspective view of a twine 7 first engaging a twine engaging loop 6. In this depiction, the twine 7 is being drawn from left to right with a twine tensioned end 22 and a twine looping end 23. The twine tensioned end 22 is already engaged in the twine engaging loop 6 of another preceding frame 5 along the crop row 3 or, in the case of the first frame 5 at a first row end 10, the twine tensioned end 22 would be engaged at a stake 16 or otherwise tied off at the first row end 10. As can be seen in FIG. 4, the twine looping end 23 does not pass through the circular loop 19, but engages the twine engaging loop 6 at the loop open end 20 and is drawn into the gap 24, which should be of a dimension no less than the thickness of the twine 7. A suitable material for the twine 7 would be non-stretchable polypropylene although other materials may be used.

Figure 5:
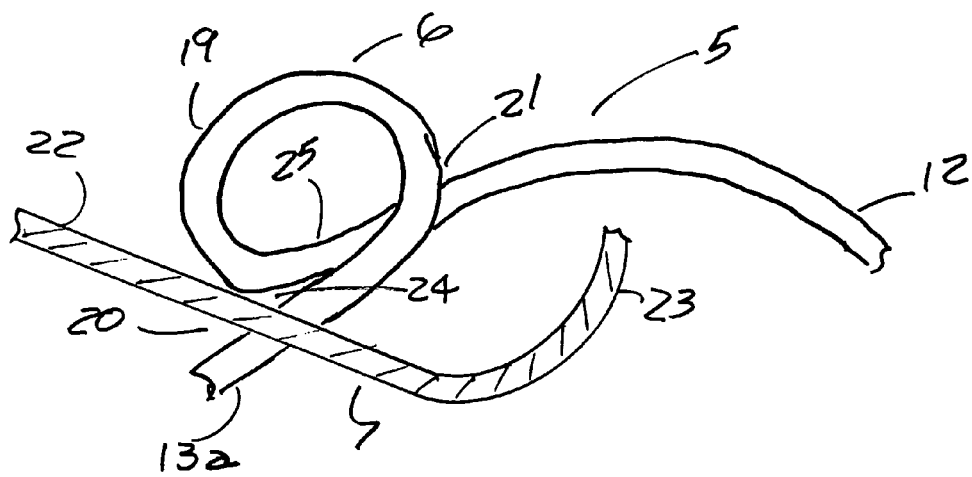
FIG. 5 is a perspective view of a twine having engaged the twine engaging loop and being looped around the twine engaging loop.

FIG. 5 is a perspective view of a twine 7 having engaged a twine engaging loop 6 and being looped around the twine engaging loop 6. The twine looping end 23 has been drawn into the gap 24 at the loop open end 20 and is being looped around the circular loop 19 at the loop closed end 21.

Figure 6:
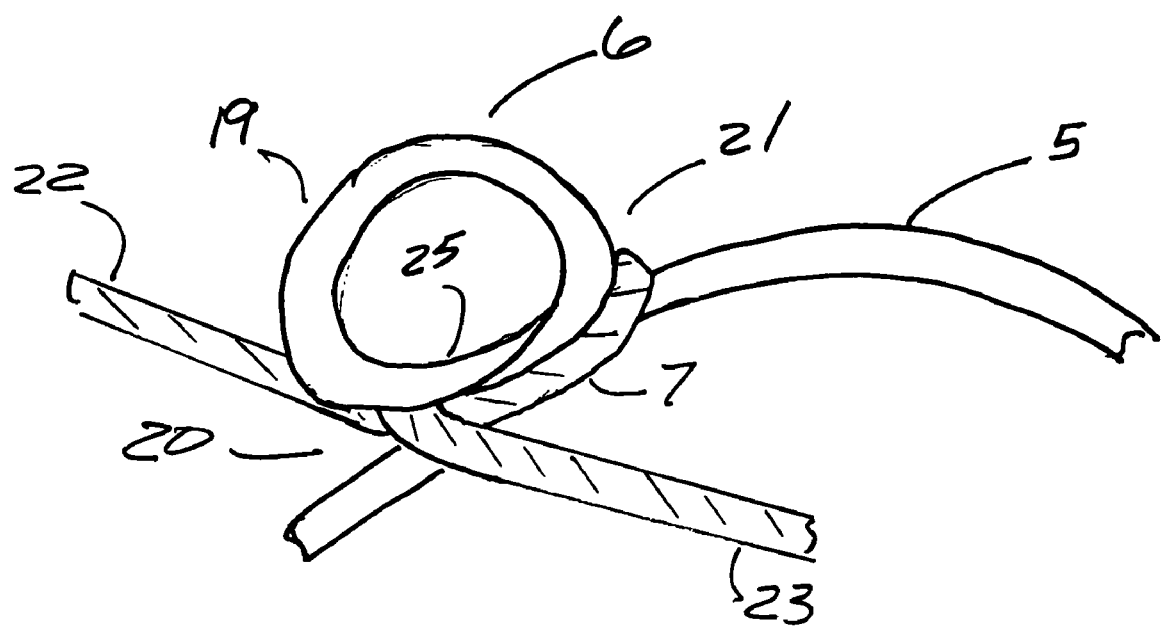
FIG. 6 is a perspective view of a twine fully engaged around the twine engaging loop and being tensioned to engage the next twine engaging loop.

FIG. 6 is a perspective view of a twine 7 having fully engaged a twine engaging loop 6 and being tensioned to engage a twine engaging loop 6 on a successive frame 5 along the crop row 3. As can be seen in FIG. 6, the twine looping end 23 is looped completely around the circular loop 19 and exits the circular loop 19 at the loop open end 20 crossing over that portion of the twine looping end 23 first drawn into the gap 24 at the loop open end 20. Once fully engaged at a twine engaging loop 6, the twine 7 can be drawn tightly towards the twine engaging loop 6 on the next successive frame 5 along the crop row 3. The twine looping end 23 then becomes a twine tensioned end 22 for the next twine engaging loop 6. Because the twine 7 is in tension between frames 5, the twine 7 provides full support for the cover 8 along the length of the crop row 3, while the frames 5 provide full support for the cover 8 across the crop row 3.

Because the twine 7 does not pass through the circular loop 19, the twine 7 can be rapidly engaged with the twine engaging loop 6 by a simple looping motion. Likewise, the twine 7 can be rapidly disengaged from the twine engaging loop 6 by a reversal of the looping illustrated in FIGS. 4, 5 and 6.

The simple placement and removal of the frames 5 can done in conjunction with the engagement and disengagement of the twine 7 with the twine engaging loops 6 or separately. For example, a person could walk along a crop row 3 and easily install frames 5 at the required spacing by simply pressing the first and second soil engaging ends 12 and 13 into the furrows 4 and 4a on either side of the crop row 3. Once a frame 5 is in place, twines 7 running from the twine engaging loops 6 of the previously installed frame 5 can be quickly engaged and looped about the twine engaging loops 6 of the present frame 5 by the same person who installed the frame 5. Alternatively, one person could walk along the crop row 3 and install the frames 5 at the required spacing, while another person could follow and engage the twines 7 with the twine engaging loops 6 of each successive frame 5.

Once the frames 5 have been installed along a crop row 3 and twines 7 have been successively engaged in tension on the twine engaging loops 6 on the frames 5, a cover 8 can be draped over the frames 5 and twines 7 and the inner surface 17 of the cover 8 will not touch the plants 2. It is also intended that the cover 8 may be draped over more than one crop row 3, depending on how many crop rows 3 has been fitted with frames 5 and twine 7. The direction of draping of the cover 8 will depend on the width and roll length of the cover 8 as well as the length of the crop rows 3 and the number of crop rows 3 in a field. Once the cover 8 is in place over the frames 5 and twine 7 it can be held in place by weighting it down in the furrows 4 and at the edge of the field.

Although there are several materials available for the cover 8 such as plastic sheeting which may provide immediate protection against an imminent problem such as freeze or frost, most of these materials would have to be removed quickly to allow sunlight and water to reach the plants. There are now frost protection materials such as woven and non-woven synthetic polymeric fabrics which are porous to air and water and allow sunlight to pass through, but still provide protection against severe weather conditions and insects. Covers 8 of these materials can be left in place over the crop rows 3, thereby eliminating the need and cost of installation and removal more than once throughout the growing season.

The invention claimed is:

1. A method for the installation of a plant protection system for a row of plants in soil having a first row end and a second row end comprising the steps of;

providing a plurality of frames wherein each frame has a first soil engaging end, an upper portion and a second soil engaging end and each frame has at least one upwardly directed circular twine engaging loop located on the upper portion of the frame with a loop open end and a loop closed end, with a gap no less than the thickness of a twine between the loop open end and the upper portion of the frame and the loop closed end is in contact with the upper portion of the frame;

providing at least one twine, having a first twine end and a second twine end;

providing a cover, wherein said cover has an inner surface and an outer surface;

inserting both the first soil engaging end and the second soil engaging end of each of said frames into the ground to span said row in a plurality of positions from the first row end to the second row end extending along said row;

fixedly securing the first twine end of said twine to the soil at the first row end;

successively engaging the twine under tension in the twine engaging loop on the upper portion of each of said frames extending along said row;

wherein the step of successively engaging the twine under tension in the twine engaging loop further comprises the steps of first engaging the twine in the gap at the loop open end of the twine engaging loop, looping the twine completely around the circular loop and over the loop closed end, tensioning the twine engaging loop at the loop open end and engaging the twine engaging loop on the frame next in position along the row;

and fixedly securing the second twine end of said twine to the soil at the second row end;

draping said cover over said frames and twine wherein said inner surface faces the plants but only contacts said frames and twine.

\* \* \* \* \*